(12) United States Patent
Weston et al.

(10) Patent No.: US 11,926,541 B2
(45) Date of Patent: Mar. 12, 2024

(54) PROCESS OF MAKING ALKALINE AND ACIDIC WATER

(71) Applicant: G WATER LLC, Waterford, MI (US)

(72) Inventors: Dean D. Weston, Waterford, MI (US); Paul D. Manos, Stateline, NV (US)

(73) Assignee: G WATER LLC, Waterford, MI (US)

( * ) Notice: Subject to any disclaimer, the term of this patent is extended or adjusted under 35 U.S.C. 154(b) by 0 days.

(21) Appl. No.: 15/573,260

(22) PCT Filed: May 5, 2016

(86) PCT No.: PCT/US2016/030900
§ 371 (c)(1),
(2) Date: Nov. 10, 2017

(87) PCT Pub. No.: WO2016/186852
PCT Pub. Date: Nov. 24, 2016

(65) Prior Publication Data
US 2018/0134586 A1 May 17, 2018

Related U.S. Application Data

(60) Provisional application No. 62/162,197, filed on May 15, 2015.

(51) Int. Cl.
*C02F 1/461* (2023.01)
*C02F 1/02* (2023.01)
*C02F 1/44* (2023.01)
*C02F 1/00* (2023.01)

(52) U.S. Cl.
CPC .............. *C02F 1/4618* (2013.01); *C02F 1/02* (2013.01); *C02F 1/44* (2013.01); *C02F 1/001* (2013.01); *C02F 2001/46185* (2013.01); *C02F 2001/4619* (2013.01); *C02F 2201/46135* (2013.01); *C02F 2201/46145* (2013.01); *C02F 2201/46155* (2013.01); *C02F 2209/04* (2013.01); *C02F 2209/055* (2013.01); *C02F 2209/06* (2013.01); *C02F 2209/07* (2013.01); *C02F 2209/10* (2013.01); *C02F 2303/04* (2013.01)

(58) Field of Classification Search
CPC ............ C02F 1/4618; C02F 1/44; C02F 1/02
See application file for complete search history.

(56) References Cited

U.S. PATENT DOCUMENTS

| | | | |
|---|---|---|---|
| 4,289,599 A | 9/1981 | Fushihara | |
| 4,325,975 A | 4/1982 | Lindon et al. | |
| 5,306,511 A | 4/1994 | Whang | |
| 5,736,027 A | 4/1998 | Nakamura | |
| 5,980,703 A | 11/1999 | Yamada et al. | |
| 6,572,902 B2 | 6/2003 | Abramowitz et al. | |
| 2,867,569 A1 | 9/2003 | Morisawa et al. | |
| 6,623,615 B1 | 9/2003 | Morisawa et al. | |
| 6,833,087 B2 | 12/2004 | Beck et al. | |
| 7,090,878 B2 | 8/2006 | Mehansho et al. | |
| 7,264,847 B2 | 9/2007 | Manos | |
| 2003/0189013 A1* | 10/2003 | Unhoch | A01N 47/44 210/764 |
| 2006/0275387 A1 | 12/2006 | Bagley | |
| 2008/0003220 A1* | 1/2008 | Gokarn | A61P 41/00 424/135.1 |
| 2008/0291755 A1 | 11/2008 | Green et al. | |
| 2012/0328738 A1 | 12/2012 | Green | |
| 2013/0122150 A1 | 5/2013 | Kim | |
| 2014/0116954 A1 | 5/2014 | Elson et al. | |
| 2014/0271996 A1 | 9/2014 | Prakash et al. | |

FOREIGN PATENT DOCUMENTS

| | | | |
|---|---|---|---|
| EP | 1162176 A1 | 12/2001 | |
| EP | 2583567 A1 | 4/2013 | |
| JP | 0338296 A | 2/1991 | |
| JP | H0338296 B2 * | 6/1991 | |
| JP | 0616169 A | 4/1994 | |
| JP | 06273938 A | 9/1994 | |
| JP | 0999287 A | 4/1997 | |

(Continued)

OTHER PUBLICATIONS

Eliot, Adele "How Long to Boil Water for Purification" USA Today Jul. 1, 2012 https://traveltips.usatoday.com/long-boil-water-purification-62933.html pp. 1 (Year: 2012).*

Fraser et al. "Cleaning and Sanitizing" pp. 1-6 May 26, 2012 http://www.foodsafetysite.com/resources/pdfs/EnglishServSafe/ENGSection11Cleaning.pdf (Year: 2012).*

Food Additives Data Book Edited by Jim Smith and Lily Hong-Shum First published 2003 by Blackwell Science Ltd http://blogs.unpad.ac.id/souvia/files/2009/12/food-additives-databook2.pdf (Year: 2009).*

(Continued)

*Primary Examiner* — Vera Stulii

(74) *Attorney, Agent, or Firm* — WILSON SONSINI GOODRICH & ROSATI

(57) ABSTRACT

A process of making an alkaline water and acidic water wherein the step of dissolving the alkaline salt in the initial stream is further defined as adding the alkaline salt of a lower alkyl carboxylic acid of sodium propionate to the initial stream. The step of electrolyzing the feed stream further includes a step of applying an electric potential between the cathode and the anode. The step of applying the electrical potential is further defined as applying the electrical potential of between 0.5V and 50 V between the cathode and the anode. The alkaline water composition produced by the process includes zero hydroxide ions and defines a total alkalinity between 40 ppm and 510 ppm. The alkaline water also has a TDS between 58 ppm and 1000 ppm, a pH between 10.0 and 12.0, a hardness rating between 3.5 and 10, and a Langelier Index between 0.37 and 2.20.

7 Claims, 1 Drawing Sheet

(56) References Cited

FOREIGN PATENT DOCUMENTS

| JP | H10314743 A | | 12/1998 |
|----|----|----|----|
| JP | 2003047962 A | * | 2/2003 |
| JP | 2003047962 A | | 2/2003 |
| JP | 2004042025 A | | 2/2004 |
| WO | 9921437 A1 | | 5/1999 |
| WO | 0212131 A2 | | 2/2002 |
| WO | WO-2007077654 A1 | | 7/2007 |
| WO | 2008138357 A1 | | 11/2008 |
| WO | 2008138358 A1 | | 11/2008 |
| WO | WO-2014002360 A1 | | 1/2014 |

OTHER PUBLICATIONS https://urparamount.com/articles/ORP/what-orp.html What is ORP? By Tina Rappaport—May 18, 2005 (Year: 2005).*
International Search Report and Written Opinion for PCT/US2016/030900 dated Aug. 2, 2016, pp. 1-8.

* cited by examiner

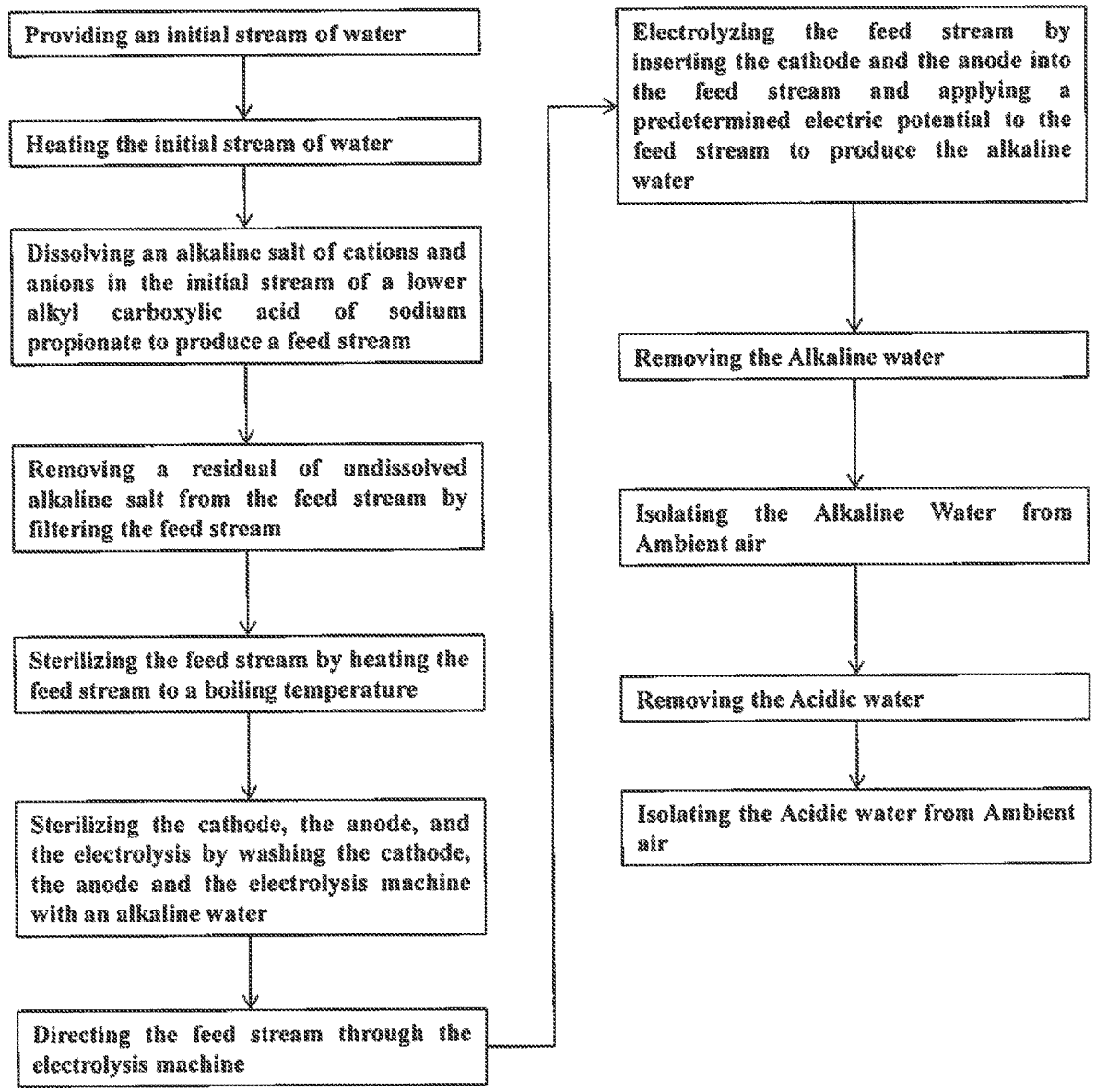

PROCESS OF MAKING ALKALINE AND ACIDIC WATER

CROSS REFERENCE TO RELATED APPLICATION

This application claims the benefit of PCT International Application Serial No. PCT/US2016/030900 filed on May 5, 2016, which claims priority to U.S. Provisional Patent Application 62/162,197 filed on May 15, 2015, and entitled "Process of Making Alkaline and Acidic Water" the entire disclosures of which are incorporated herein by reference in its entirety.

BACKGROUND OF THE INVENTION

1. Field of the Invention

The present invention generally relates to an alkaline water composition and a process for producing the alkaline water.

2. Description of the Prior Art

There have been various attempts to enhance alkaline drinking water. One such process is disclosed in U.S. Pat. No. 6,572,902. The process includes a step of dissolving an alkaline salt of cations and anions in the initial stream to produce a feed stream including the initial stream containing the cations and the anions of the alkaline salt and a residual of undissolved alkaline salt. The next step of the process is electrolyzing the feed stream to dissociate the water into hydrogen ions and hydroxide ions and to produce the alkaline water adjacent to the cathode and the acidic water adjacent to the anode. Then, the alkaline water and the acidic water are removed.

The U.S. Pat. No. 6,572,902 also discloses an alkaline water composition including a plurality of sodium ions, a plurality of carbonate ions, and a plurality of bicarbonate ions.

SUMMARY OF THE INVENTION

The invention provides for such a method wherein the step of dissolving the alkaline salt in the initial stream is further defined as adding the alkaline salt of a lower alkyl carboxylic acid to the initial stream in a range from 26 ppm to 1321 ppm to produce the feed stream and allow the alkaline water obtained from the step of applying the potential to have a low pH at the low end of the range and a high pH at high end of the range.

The invention provides for an alkaline water composition defining a total alkalinity of between 40 ppm and 510 ppm and a total dissolved solids of between 58 ppm and 1000 ppm and including zero hydroxide ions

Advantages of the Invention

The invention provides an alkaline water that has zero hydroxide ions. The present invention also provides for an alkaline water that is resistant to pH changes.

The invention provides for a process of making the alkaline water that eliminates hydroxide ions generated during the step of electrolyzing the water to produce the alkaline water with zero hydroxide ions and is resistant to pH changes.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a schematic flow chart of the process for producing the alkaline water and acidic water.

DESCRIPTION OF THE ENABLING EMBODIMENT

Referring to the FIGURES, wherein like numerals indicate corresponding parts throughout the several views, a schematic flowchart of the process for producing an alkaline water and acidic water in accordance with the present invention is best shown in FIG. 1.

One aspect of the present invention provides a process for producing the alkaline water having a pH of between 10.0 and 12.0 and acidic water from an initial stream of water having a TDS content of between 0 ppm and 10 ppm. The process uses an electrolysis machine having at least one cathode, at least one anode, and at least one filter of porous membrane. The filter of porous membrane has a particle size of no more than 1 μm. The initial stream of water having the TDS content of between 0 ppm and 10 ppm may be obtained by sending tap water through series of filtration system and/or purification system, e.g. ultrafilters and reverse osmosis systems. Alternatively, the initial stream of water having a TDS content of between 0 ppm and 10 ppm may be directly purchased from a manufacturer.

The process includes a step of heating the initial stream to a predetermined temperature of at least 150° F. It should be appreciated that the initial stream may be heated by using any heating source such as but not limited to a water heater. After heating the initial stream of water, an alkaline salt of cations and anions is dissolved in the initial stream to produce a feed stream containing the cations, the anions of the alkaline salt, and a residual of undissolved alkaline salt.

The next step of the process includes removing the residual of undissolved alkaline salt from the feed stream by filtering the feed stream through the at least one filter of porous membrane having a particle size of no more than 1 μm. Alternatively, a plurality of filters may be disposed in series with one another to remove the residual of undissolved alkaline salt from the feed stream. Then, the feed stream is sterilized. The step of sterilizing the feed stream is further defined as heating the feed stream to a boiling temperature of at least 212° F. for at least three minutes to sterilize the feed stream and eliminate bacteria. It should be appreciated that the feed stream may be sterilized by other methods such as but not limited to ultraviolet (UV) purification. Next, the cathode, the anode, and the electrolysis machine are sterilized. The step of sterilizing the cathode, the anode, and the electrolysis machine is further defined as washing the electrolysis machine and the cathode and the anode with an alkaline solution having a pH of at least 11.5. It should be appreciated that the cathode, the anode, and the electrolysis machine can be sterilized by other methods such as but not limited to UV purification and/or using an autoclave.

In the next step of the process, the feed stream is directed through the electrolysis machine at a predetermined flow rate of three liters per minute. The feed stream is then electrolyzed to dissociate the water into hydrogen ions and hydroxide ions and to produce the alkaline water adjacent to the cathode and acidic water adjacent to the anode. The step of electrolyzing the feed stream further includes a step of inserting the cathode and the anode into the feed stream in a spaced relationship and a step of applying an electric potential between the cathode and the anode. Without being bound by theory, by applying the electrical potential between the cathode and the anode, the electric potential between the cathode and the anode causes individual water molecules to dissociate into hydrogen ions and hydroxide ions. At the same time, the applied electrical potential produces a current between the cathode and the anode to allow the hydrogen ions to migrate to the anode to produce the acidic water and the hydroxide ions to migrate to the cathode to produce the alkaline water.

The alkaline water is then removed. After removing the alkaline water, the alkaline water is isolated from ambient air and the acidic water to prevent the alkaline water from interacting with the ambient air and the acidic water. It should be appreciated that the alkaline water can be stored under a negative atmosphere to prevent the interaction between the alkaline water and the ambient air. Because the alkaline water tends to react with the carbon dioxide in the ambient air thereby reducing the pH of the alkaline water, by storing the alkaline water in the negative atmosphere, the alkaline water is isolated from the ambient air to prevent the interaction between the carbon dioxide and the alkaline water to preserve the pH of the alkaline water. At the same time, the acidic water is removed. After removing the acidic water, as the acidic water is isolated from ambient air and the alkaline water to prevent the acidic water from interacting with the ambient air and the alkaline water. It should be appreciated that the acidic water can be stored under a negative atmosphere to prevent the interaction between the acidic water and the ambient air.

The step of dissolving the alkaline salt in the initial stream is further defined as adding the alkaline salt of a lower alkyl carboxylic acid of sodium propionate to the initial stream. The sodium propionate is added in a range from 26 ppm to 1321 ppm to produce the feed stream containing the cations of sodium and anions of propionate and the residual of undissolved alkaline salt of sodium propionate. The added sodium propionate allow the alkaline water obtained from the step of applying the potential to have a low pH at the low end of the range and a high pH at the high end of the range. In other words, the amount of sodium propionate added to the initial stream has a direct relationship with the pH of the alkaline water. For example, a low amount of sodium propionate, e.g. 26 ppm, added to the initial stream produces the alkaline water having the low pH, e.g. 10.0, and a high amount of sodium, e.g. 1321 ppm, added to the initial stream produces the alkaline water having the high pH, e.g. 12.0.

The step of applying the electrical potential is further defined as applying the electrical potential of between 0.5V and 50V between the cathode and the anode. The application of the electric potential causes the migration of the hydrogen ions toward the anode to produce the acidic water having the pH between 4.0 and 5.0. In addition, the application of the electric potential causes migration of the hydroxide ions toward the cathode to produce the alkaline water having the pH between 10.0 and 12.0. At the same time, the application of the electric potential dissociates the anions of propionate into hydrogen gas, carbon dioxide, and ethylene and to allow the carbon dioxide, the hydrogen gas, and the hydroxide ions to react to produce carbonate ions and bicarbonate ions dissolved in the alkaline water. Without being bound by theory, bicarbonate ions may also react with the hydroxide ions to produce carbonate ions and water molecules. The alkaline water obtained from the process contains the sodium ions being present between 10 ppm and 150 ppm, the carbonate ions being present between 31 ppm and 440 ppm, and the bicarbonate ions being present between 9 ppm and 70 ppm. The alkaline water also includes zero hydroxide ions and defines the total alkalinity between 40 ppm and 510 ppm and the total dissolved solids between 58 ppm and 1000 ppm.

It is another aspect of the present invention to provide alkaline water composition. The alkaline water composition includes a plurality of sodium ions being present between 10 ppm and 150 ppm, a plurality of carbonate ions being present between 31 ppm and 440 ppm, and a plurality of bicarbonate ions being present between 9 ppm and 70 ppm. The alkaline water composition also includes zero hydroxide ions and defines the total alkalinity between 40 ppm and 510 ppm and the total dissolved solids between 58 ppm and 1000 ppm. The alkaline water has the pH between 10.0 and 12.0, the hardness rating between 3.5 and 10.0, and the Langelier Index between 0.37 and 2.20. The alkaline water composition also has an Oxidation-Reduction Potential (ORP) of between −220 mV and −280 mV to provide anti-corrosion and anti-oxidant properties to the alkaline water.

For a better understanding and of the present invention, exemplary examples of the present invention are set forth below. The exemplary examples are for illustrative purpose only and do not in limit the scope of the present invention.

Example 1

The initial stream of water having a TDS of 0 ppm is directly purchased from Arrowhead Distilled. The initial stream is heated to 150° F. 0.25 g (26 ppm) of sodium propionate is added to the initial stream to produce a feed stream. The residual of undissolved sodium propionate is removed from the feed stream through the first filter having the particle size of no more than 1 µm. Then, feed stream is sterilized by heating the feed stream to a boiling temperature of at least 212° F. for at least three minutes to remove eliminate bacteria from the feed stream. The feed stream is electrolyzed by applying an electric potential of 34.32V to produce the alkaline water adjacent to the cathode and the acidic water adjacent to the anode. The results were analyzed by the Western Environmental Testing Laboratory. The composition of the alkaline water and the properties of the alkaline water is set forth in the Table 1 and Table 2, respectively, below:

TABLE 1

The Composition of the Alkaline Water of Example 1

| Element | Amount (ppm) |
| --- | --- |
| Hydroxide | None |
| Sodium | 23 |
| Bicarbonate | 9.1 |
| Carbonate | 31 |

TABLE 2

The Properties of the Alkaline Water of Example 1

| Property | Amount |
| --- | --- |
| pH | 10.28 |
| Total Alkalinity (ppm) | 40 |
| TDS (ppm) | 58 |

TABLE 2-continued

The Properties of the Alkaline Water of Example 1

| Property | Amount |
| --- | --- |
| Electrical Conductivity (μmhos/cm) | 150 |
| Turbidity (NTU) | 0.31 |
| Langelier Index | NA |

Example 2

The initial stream of water having a TDS of 0 ppm is directly purchased from Arrowhead Distilled. The initial stream is heated to 150° F. 4 g (400 ppm) of sodium propionate is added to the initial stream to produce a feed stream. The residual of undissolved sodium propionate is removed from the feed stream through the first filter having the particle size of no more than 1 μm. Then, feed stream is sterilized by heating the feed stream to a boiling temperature of at least 212° F. for at least three minutes to remove eliminate bacteria from the feed stream. The feed stream is electrolyzed by applying an electric potential of 21.15V to produce the alkaline water adjacent to the cathode and the acidic water adjacent to the anode. The results were analyzed by the Western Environmental Testing Laboratory. The composition of the alkaline water and the properties of the alkaline water is set forth in the Table 3 and Table 4, respectively, below:

TABLE 3

The Composition of the Alkaline Water of Example 2

| Element | Amount (ppm) |
| --- | --- |
| Hydroxide | None |
| Sodium | 150 |
| Bicarbonate | 52 |
| Carbonate | 220 |

TABLE 4

The Properties of the Alkaline Water of Example 2

| Property | Amount |
| --- | --- |
| pH | 11.19 |
| Total Alkalinity (ppm) | 270 |
| TDS (ppm) | 500 |
| Electrical Conductivity (μmhos/cm) | 900 |
| Turbidity (NTU) | 0.29 |
| Langelier Index | NA |

Example 3

The initial stream of water having a TDS of 0 ppm is directly purchased from Arrowhead Distilled. The initial stream is heated to 150° F. 0.5 g (66 ppm) of sodium propionate is added to the initial stream to produce a feed stream. The residual of undissolved sodium propionate is removed from the feed stream through the first filter having the particle size of no more than 1 μm. Then, feed stream is sterilized by heating the feed stream to a boiling temperature of at least 212° F. for at least three minutes to remove eliminate bacteria from the feed stream. The feed stream is electrolyzed by applying an electric potential of 32V to produce the alkaline water adjacent to the cathode and the acidic water adjacent to the anode. The results were analyzed by the Western Environmental Testing Laboratory. The composition of the alkaline water and the properties of the alkaline water is set forth in the Table 5 and Table 6, respectively, below:

TABLE 5

The Composition of the Alkaline water of Example 3

| Element | Amount (ppm) |
| --- | --- |
| Hydroxide | None |
| Sodium | 63 |
| Bicarbonate | 24 |
| Carbonate | 84 |

TABLE 6

The Properties of the Alkaline water of Example 3

| Property | Amount |
| --- | --- |
| pH | 10.63 |
| Total Alkalinity (ppm) | 110 |
| TDS (ppm) | 150 |
| Electrical Conductivity (μmhos/cm) | 400 |
| Turbidity (NTU) | 0.70 |
| Langelier Index | 0.37 |

Example 4

The initial stream of water having a TDS of 0 ppm is directly purchased from Arrowhead Distilled. The initial stream is heated to 150° F. 2.5 g (250 ppm) of sodium propionate is added to the initial stream to produce a feed stream. The residual of undissolved sodium propionate is removed from the feed stream through the first filter having the particle size of no more than 1 μm. Then, feed stream is sterilized by heating the feed stream to a boiling temperature of at least 212° F. for at least three minutes to remove eliminate bacteria from the feed stream. The feed stream is electrolyzed by applying an electric potential of 20V to produce the alkaline water adjacent to the cathode and the acidic water adjacent to the anode. The results were analyzed by the Western Environmental Testing Laboratory. The composition of the alkaline water and the properties of the alkaline water is set forth in the Table 7 and Table 8, respectively, below:

TABLE 7

The Composition of the Alkaline water of Example 4

| Element | Amount (ppm) |
| --- | --- |
| Hydroxide | None |
| Sodium | N/A |
| Bicarbonate | 71 |
| Carbonate | 440 |

TABLE 8

The Properties of the Alkaline water of Example 4

| Property | Amount |
| --- | --- |
| pH | 11.26 |
| Total Alkalinity (ppm) | 510 |

TABLE 8-continued

The Properties of the Alkaline water of Example 4

| Property | Amount |
| --- | --- |
| TDS (ppm) | 980 |
| Electrical Conductivity (μmhos/cm) | 1700 |
| Turbidity (NTU) | N/A |
| Langelier Index | 2.20 |

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A process of producing an alkaline water having a pH of between 10.0 and 12.0 and an acidic water having a pH of between 4.0 and 5.0 from an initial stream of water having a total dissolved solid content between 0 ppm and 10 ppm, by electrolysis with at least one cathode and at least one anode, said process comprising the steps:
dissolving an alkaline salt of sodium propionate in the initial stream to produce a feed stream including the initial stream containing the cations of sodium and the anions of propionate and a residual of undissolved alkaline salt of sodium propionate,
electrolyzing the feed stream to dissociate water into hydrogen ions and hydroxide ions and to produce an alkaline water adjacent to a cathode and acidic water adjacent to an anode,
removing the alkaline water, and
removing the acidic water,
wherein said step of electrolyzing the feed stream further includes a step of applying an electric potential of between 20V and 50V between the cathode and the anode, wherein said process further includes a step of sterilizing the cathode and the anode and an electrolysis machine prior to said step of electrolyzing the feed stream, wherein the alkaline water has an Oxidation-Reduction Potential (ORP) of between −220 mV and −280 mV.

2. The process of producing the alkaline water as set forth in claim 1 further includes a step of sterilizing the feed stream prior to said step of electrolyzing the feed stream.

3. The process of producing the alkaline water as set forth in claim 1 wherein said step of sterilizing the cathode and the anode and the electrolysis machine is further defined as washing the electrolysis machine and the cathode and the anode with an alkaline solution having a pH of at least 11.5 prior to said step of electrolyzing the feed stream.

4. The process of producing the alkaline water as set forth in claim 1 further includes a step of directing the feed stream through the electrolysis machine at a predetermined flow rate of three liters per minute prior to said step of electrolyzing the feed stream.

5. The process of producing the alkaline water as set forth in claim 1 wherein said step of electrolyzing the feed stream further includes a step of inserting the cathode and the anode into the feed stream in a spaced relationship prior to said step of applying the electric potential.

6. A process of producing alkaline water containing sodium ions, carbonate ions, and bicarbonate ions having a pH of between 10.0 and 12.0, and acidic water having a pH of between 4.0 and 5.0 from an initial stream of water having a total dissolved solid content of between 0 ppm and 10 ppm, by electrolysis using an electrolysis machine having at least one cathode and at least one anode, and at least one filter of porous membrane having a particle size of no more than 1 μm, said process comprising the steps:
heating the initial stream to a predetermined temperature of at least 150° F.,
dissolving an alkaline salt of sodium propionate in the initial stream in a range from 26 ppm to 1321 ppm to produce a feed stream containing the cations of sodium and the anions of propionate and a residual of undissolved alkaline salt of sodium propionate,
removing the residual of undissolved alkaline salt from the feed stream by filtering the feed stream through at least one filter of porous membrane having a particle size of no more than 1 μm,
sterilizing the feed stream,
said step of sterilizing the feed steam being further defined as heating the feed stream to a boiling temperature of at least 212° F. for at least three minutes to sterilize the feed stream and eliminate bacteria,
sterilizing a cathode and an anode and an electrolysis machine,
said step of sterilizing the cathode and the anode and the electrolysis machine being further defined as washing the electrolysis machine and the cathode and the anode with an alkaline solution having a pH of at least 11.5,
directing the feed stream through the electrolysis machine at a predetermined flow rate of three liters per minute,
electrolyzing the feed stream to dissociate water into hydrogen ions and hydroxide ions and to produce the alkaline water adjacent to the cathode and acidic water adjacent to the anode,
said step of electrolyzing the feed stream further including a step of inserting the cathode and the anode into the feed stream in a spaced relationship,
said step of electrolyzing the feed stream further including a step of applying an electric potential between the cathode and the anode,
removing the alkaline water,
removing the acidic water,
isolating the alkaline water from ambient air and the acidic water to prevent the alkaline water from interacting with ambient air and the acidic water after said step of removing the alkaline water, and
isolating the acidic water from the ambient air and the alkaline water to prevent the acidic water from interacting with the ambient air and the alkaline water after said step of removing the acidic water,
and characterized by,
said step of applying the electrical potential being further defined as applying the electrical potential of between 20V and 50V between the cathode and the anode thereby migrating the hydrogen ions toward the anode to produce the acidic water having a pH between 4.0 and 5.0 and migrating the hydroxide ions toward the cathode to produce the alkaline water having a pH between 10.0 and 12.0 and dissociating the anions of propionate into hydrogen gas and carbon dioxide and ethylene and to react the carbon dioxide and the hydrogen gas and the hydroxide ions to produce carbonate ions and bicarbonate ions dissolved in the alkaline water containing sodium ions being present between 10 ppm and 150 ppm and the carbonate ions being present between 31 ppm and 440 ppm and the bicarbonate ions being present between 9 ppm and 70 ppm and zero hydroxide ions to define a total alkalinity between 40 ppm and 510 ppm and a total dissolved solids between 58 ppm and 1000 ppm, wherein the alkaline water has an Oxidation-Reduction Potential (ORP) of between −220 mV and −280 mV.

7. The process of producing the alkaline water as set forth in claim 1 wherein said step of electrolyzing the feed stream further includes a step of applying an electric potential of between 20V and 35V between the cathode and the anode.

\* \* \* \* \*